Oct. 31, 1967
F. E. URBEN
3,350,007
NAVIGATION SLIDE RULE
Filed May 26, 1966
2 Sheets-Sheet 1
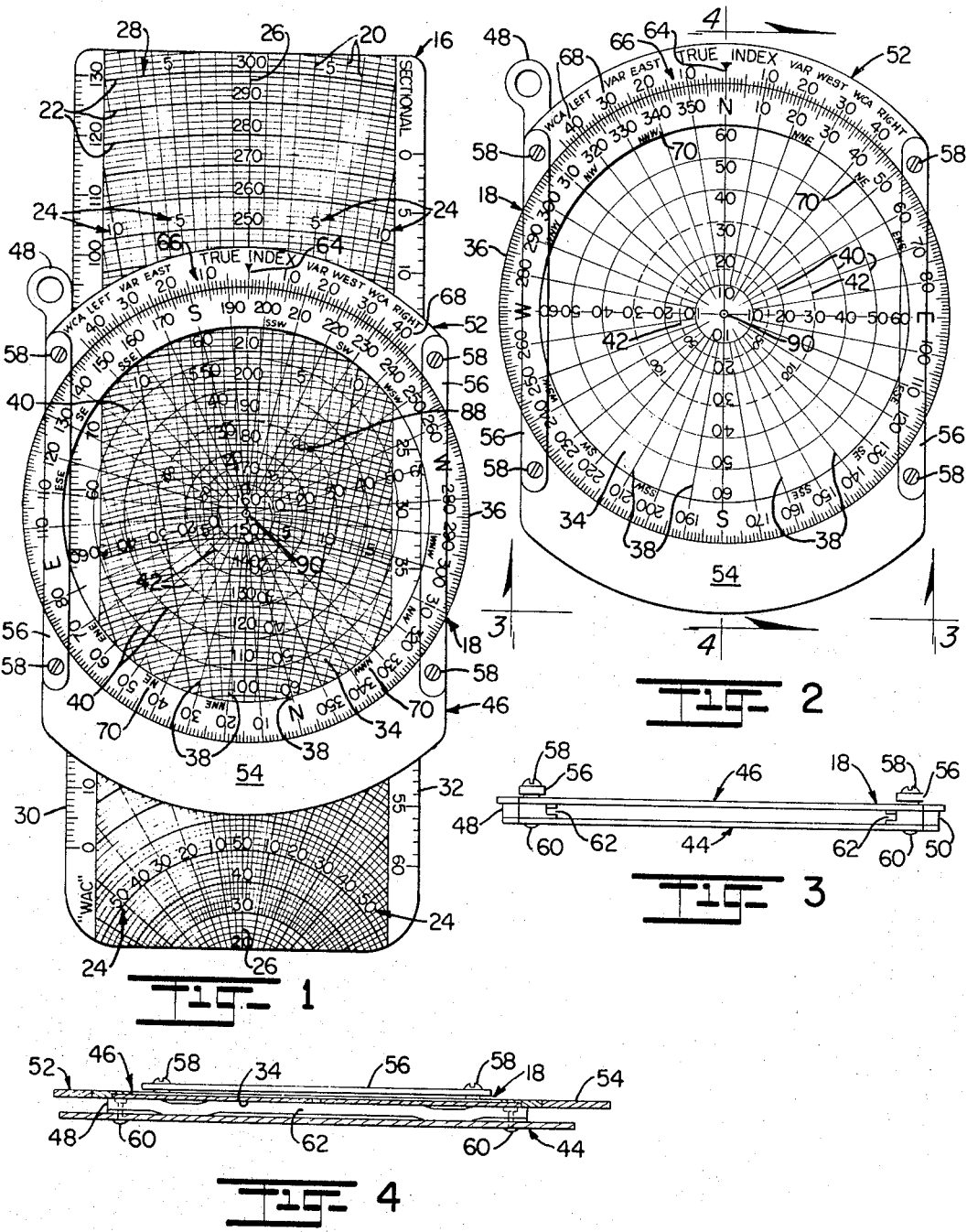
INVENTOR.
FREDERICK E. URBEN
BY
Sheridan and Ross
ATTORNEYS Oct. 31, 1967

F. E. URBEN 3,350,007

NAVIGATION SLIDE RULE

Filed May 26, 1966

INVENTOR.
FREDERICK E. URBEN
BY
*Sheridan and Ross*
ATTORNEYS

United States Patent Office 3,350,007
Patented Oct. 31, 1967

3,350,007
NAVIGATION SLIDE RULE
Frederick E. Urben, Englewood, Colo., assignor to Jeppesen & Co., Denver, Colo., a corporation of Colorado
Filed May 26, 1966, Ser. No. 553,073
5 Claims. (Cl. 235—88)

ABSTRACT OF THE DISCLOSURE

The subject invention relates to a navigation slide rule useful for solving wind vector problems and comprising a pair of superposed members, the lower one of said members having polar coordinate-lines thereon and the upper one of said members having a transparent central portion and a 360° compass rose circumscribing said central portion. The transparent central portion has a series of radial lines and a series of concentric circular lines formed thereon. The circular lines are spaced at fixed intervals from each other and calibrated in velocities. The superposed members are mounted for rotary and translatory movement with respect to each other. The series of concentric circular lines formed on the transparent central portion may include a first set of circular lines and a second set of circular lines.

---

The present invention relates to a computing device and more particularly it relates to an improved computer for solving navigation problems.

In moderate speed aircraft aerial dead reckoning is the most common method of navigation used to direct an aircraft from one position to another. In aerial dead reckoning there are six basic variables that the navigator is continually concerned with, viz: true airspeed which is the relative speed of an aircraft through a body of air; true heading which is the direction in which the aircraft is pointed; wind speed; wind direction; ground speed which is the speed of the aircraft with relation to the ground; and true course which is the path the aircraft travels over the ground. The navigator of an aircraft has the job of pairing the six above noted quantities into appropriate vectors which are then added together to form the wind triangle which is the very heart of the dead reckoning method of aerial navigation.

The most frequently encountered problem in aerial dead reckoning is that in which the true course, the wind direction (W) and wind speed (V), and the aircraft's speed (TAS) are known. By the graphic solution of the wind vector problem the pilot-navigator can determine what heading to fly to offset the effect of the wind drifting tendency, and what the ground speed (GS) will be. The solution of this problem is basic to all pre-flight planning, providing requisite information for the filing of flight plans and the calculation of fuel consumption requirements. In flight, the periodic revision of heading and ground speed information with changing wind conditions enables the pilot to reduce the amount of deviation from the desired course, and to amend correctly the estimates of arrival times over intermediate points or at the destination.

Another application of the graphic solution of the wind vector problem occurs when the true heading (TH) and true airspeed are known to the navigator from his instruments, i.e., the compass reading (corrected for deviation and variation) will indicate the true heading, and the airspeed indicator (corrected for altitude and temperature) will give the true airspeed (TAS). The wind direction and speed must be obtained from weather bulletins preceding and during flight since wind condiitons are constantly varying. From the above given data, which as indicated must be corrected for ambient conditions, the navigator can then solve the wind triangle and get his ground speed and true course.

The ground speed combined with the time of flight will determine the distance flown, and the direction and distance values so determined can be utilized to plot a dead reckoning position on the chart.

In another application of wind vector solutions, where a fix is obtained either by radio or visual observation the true course and ground speed can be obtained, and from instruments within the aircraft the true heading and airspeed can be determined. Thus, two sides of the wind triangle are known and the third side representing the actual wind direction and speed at flight level can be computed graphically.

There are many different types of computers known that are adaptable to the solution of the various problems indicated above. All computers are directed to serve the same fundamental purpose, i.e., rapid solution of dead reckoning mathematics with the minimum attention of the navigator to the solution of the various problems.

The mathematics involved in the solution of these navigational problems is not very difficult but it is endless. The navigator must constantly be aware of how far he has traveled, in what direction the aircraft is now flying, how fast he presently is traveling (with relation to the ground), how many minutes have elapsed since his last position check, what the wind conditions are and what effect they are having upon the course and speed of the aircraft, and many other aspects of navigation. As many as 150 separate computations may be required during one flight of about 4 hours duration in order to navigate the aircraft most effectively and accurately.

Most moderate speed aircraft flown today are in private or corporate service. A great many of these aircraft are flown by one person and it usually is the case that either that person is alone in the aircraft and of necessity must perform all navigational computations while flying the craft or he is the only person qualified to fly the aircraft, if more than one person is aboard, and similarly must solve navigational problems while flying the craft.

Thus, with only one qualified pilot-navigator within the aircraft, in most instances, it becomes rather important that the pilot be able to make all computations with one hand, leaving the other hand free to control and guide the aircraft. Most smaller aircraft are not equipped with automatic pilot controls to guide the plane along a predetermined course and therefore the pilot must pay strict attention to flight problems and conditions for the entire duration of the flight.

Since the pilot is required to divide his attention between piloting the aircraft and making his navigational computations it is important to assist the pilot in any manner possible in the design of a convenient computer.

An aircraft computing device, to be suitable for effective use in moderate speed aircraft must be designed such that computations may be performed with a minimum amount of effort and with reasonable simplicity. It, further, is of considerable advantage to combine into one instrument as many devices necessary to the solution of aerial navigation problems as is conveniently and reasonably feasible, without unduly complicating the device and without the sacrifice of simplicity of any of the separate computations to be performed on the computer.

In addition to the foregoing, it has been noted that currently available computing devices have proven to be disadvantageous for a number of reasons. For example, some of the computing devices required the use of a ruler and a marking pencil in order to make the necessary calculations while other computing devices incorporated additional moving parts such as a cursor and a slide operable in conjunction with a cursor, said parts not only increasing the cost of the computing device but also being easily damaged or broken thereby rendering the computing device inoperable. It has been discovered, however, that each of the foregoing disadvantages can be overcome through the use of an improved plotting and computing device comprising a pair of superposed members, the lower one of said members having polar coordinate-lines thereon the upper one of said members having a transparent central portion, said transparent central portion having a series of radial lines and a series of concentric circular lines thereon and circular lines being spaced at fixed intervals from each other and calibrated in wind velocities, said superposed members being mounted for rotary and translatory movement with respect to each other.

Accordingly, the principal object of this invention is to provide an improved plotting and computing device for solving wind vector problems.

Another object of this invention is to provide an improved navigational computer which may be easily operated to correlate the variables necessary to the solution of navigational problems to permit navigation of an aircraft by dead reckoning.

Another object of this invention is to provide an improved plotting and computing device for solving wind vector problems that is simply and inexpensively manufactured, durable in constrution and easy to operate.

Another object of this invention is to provide an improved navigation computer that may be operated with one hand to solve all navigational problems.

Another object of this invention is to provide an improvided plotting and computing device for solving wind vector problems that is suitable for rapid and accurate correlations of the true course, true air speed, wind speed and wind direction to obtain accurate graphical representation of the ground speed and true heading of the aircraft for effective navigation of an aircraft.

Another object of this invention is to provide an improved plotting and computing device for solving wind vector problems which incorporates a member having a transparent central portion and a 360° compass rose circumscribing said central transparent portion, said transparent central portion having a series of radial lines and a series of concentric circular lines thereon, said circular lines being spaced at fixed intervals from each other and calibrated in wind velocities.

Another object of this invention is to provide a plotting and computing device for solving wind vector problems comprising a pair of superposed members, the lower one of said members having polar coordinate-lines thereon, the upper one of said members having a transpartent central portion and a 360° compass rose circumscribing said central portion, said transparent central portion having a series of radial lines and a series of concentric circular lines thereon, said circular lines being spaced at fixed intervals from each other and calibrated in wind velocities, said superposed members being mounted for rotary and translatory movement with respect to each other.

Another object of this invention is to provide a plotting and computing device for solving wind vector problems comprising a pair of superposed members, the lower one of said members having indicia on opposed surfaces thereof, said indicia comprising a plurality of radial lines and arcs and representing a portion of a polar graph, the indicia on one surface thereof being representative for one speed range and the indicia or the other surface thereof being representative for a different speed range, the upper of said members having a transpartent central portion and a 360° compass rose circumscribing said transparent central portion, said transparent central portion having a series of radial lines and a series of concentric circular lines thereon, said circular lines being spaced at fixed intervals from each other and calibrated in wind velocities, said circular lines including a first set of circular lines to be used for one of the speed ranges of said lower member and a second set of circular lines to be used for the other of said speed ranges for said lower member, said superposed members being mounted for rotary and translatory movement with respect to each other.

The foregoing and other objects and other advantages will become apparent from the specification and drawings in which:

FIGURE 1 is a plan view of the plotting and computing device constructed in accordance with this invention;

FIGURE 2 is a plan view of the top member of the plotting and computing device shown in FIGURE 1;

FIGURE 3 is an elevational view taken along line 3—3 of FIGURE 2;

FIGURE 4 is a cross-sectional view taken along line 4—4 of FIGURE 2;

Figure 5:
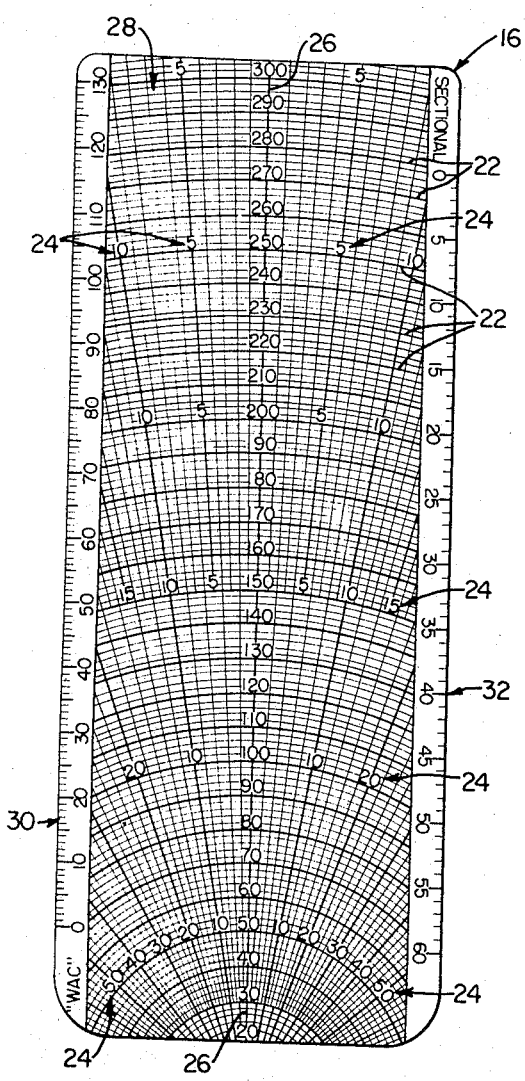
FIGURE 5 is a plan view of one side of the lower member of the plotting and computing device shown in FIGURE 1.

Referring now to the drawings and more particularly to FIGURES 1, 2 and 5, a plotting and computing device for solving wind vector problems is shown comprising a pair of superposed members 16 and 18. The lower one 16 of said pair of members has indicia comprising a plurality of radial lines 20 and arcs 22 thereon and repre- senting a portion of a polar graph. The radial lines 20 are identified by numerals 24, from 0 to 50° for the purposes of illustration, which radial lines 20 and numerals 24 are employed to indicate degrees of drift to the left or right of the center radial line 26 designated as the 0° drift line. The center radial line 26 is positioned on the longitudinal axis of the lower member 16.

The arcs 22 are provided at evenly spaced intervals along the surface 28 of the lower member 16 and are perpendicular at the respective points of intersection with each of the radial lines 20. Arcs 22 are numbered (in increasing increments of 10 for purposes of illustration) from 20 to 300 to represent graphically speed arcs. These speed arcs or speed circles are representative of one speed range, namely the speed range from 20 knots to 300 knots. Lower member 16 also preferably includes scales 30 and 32. Scale 30 is a mileage scale for wind angle correction (WAC) while scale 32 is a mileage scale for sectional charts. Thus, through the use of the plotting and computing device described herein, it is possible to measure distance on either the WAC or sectional charts conveniently without carrying a separate plotter.

The upper member 18 is mounted generally for translatory movement along the lower member 16. The upper member 18 includes a transparent central portion 34 and a 360° compass rose 36 circumscribing said central portion 34. The transparent central portion 34 has a series of radial lines 38 and a series of concentric circular lines spaced at fixed intervals from each other and calibrated in wind velocities. Said concentric circular lines preferably include a first set 40 of circular lines and a second set 42 of circular lines said second set being shown in broken lines. The purpose for the second set 42 of circular lines will be later described.

The upper member 18, in addition to the transparent central portion 34 and the circumscribing 360° compass rose 36, also comprises spaced apart means 44 and 46 and spacer means 48 and 50. Means 46 includes a pair of arcuately shaped members 52 and 54 and a pair of elongated members 56. The elongated members 56 are used to secure the arcuately shaped members 52 and 54 in a predetermined generally co-planar relation one with the other. More specifically, a pair of screws 58 are used to secure each elongated member 56 to one of the spacer means with a portion of each arcuately shaped member being disposed intermediate said elongated member 56 and its corresponding spacer means. In turn, each spacer means is secured relative to the lower means 44 by any suitable means such as rivets 60, see FIGURES 3 and 4.

Referring to FIGURES 1, 2 and 4, it will be readily appreciated that the transparent central portion 34 is mounted for rotation relative with respect to means 46 since said central portion 34 is disposed between the arcuately shaped members 52 and 54 and intermediate opposed surface portions of the elongated members 56 and the corresponding spacer means 48, 50. Thus, the central portion 34 is mounted for free rotation relative to the remaining portion of the upper member 18 and likewise the lower member 16.

Referring now to FIGURES 3 and 4, each spacer means has a side opening slot 62 formed in one side thereof. Said sides containing said side opening slot 62 are mounted in spaced apart relation facing each other. The slots 62 of said spacer means cooperate to receive and serve as guide means for the lower member 16 Although several suitable spacer means may be used in the hereindescribed invention, the spacer means referred to above are similar to those means described in U.S. Patent No. 3,112,875 and a more detailed description thereof may be found in this particular patent. It will be readily appreciated that the lower member 16 is mounted for slidable, translatable movement with respect to the upper member 18 and its transparent, central portion 34. Additionally, since said central portion 34 is mounted for relative rotation with respect to upper member 18, it is likewise mounted for relative rotation with respect to lower member 16.

Referring now to FIGURES 1 and 2, arcuately shaped member 52 is shown as having an index which is sometimes referred to as the true index. The 0° drift line 64 is centered on an arc 66 which arc is provided with a variation or drift scale. The drift scale arc 66 is provided with identifying numerals 68 thereon at 10° intervals about the periphery of said arc 66 to provide a convenient reference for drift to the right or left of the 0° drift line 64. With respect to the 360° compass rose 36, it will also be noted that a secondary scale 70 provides the 16 compass points in which wind direction is also stated. These compass points may be used for plotting the wind when the wind value is stated in terms of these points rather than in degrees of azimuth.

Figure 6:
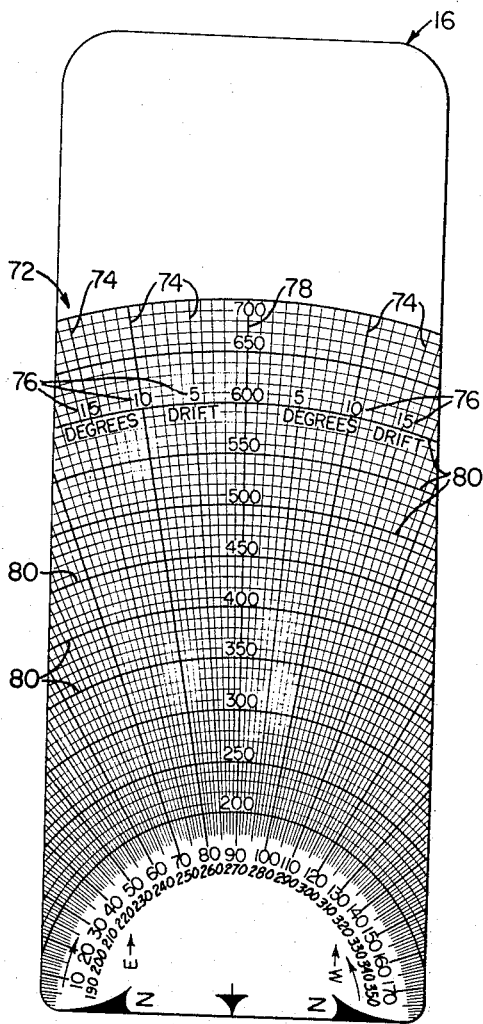
FIGURE 6 is a plan view of the reverse side of the member shown in FIGURE 5.

Referring now to FIGURE 6, surface portion 72 of member 16 includes a plurality of radial lines 74 which are identified by numerals 76, from 0° to 15° for the purposes of illustration, which radial lines 74 and numerals 76 are employed to indicate degrees of drift to the left or right of the center radial line 78 which is the 0° drift line. Central line 78 is positioned on the longitudinal axis of surface 72 of lower member 16. The arcs 80 shown on surface 72 are provided at evenly spaced intervals on surface 72 of lower member 16 and are perpendicular at the respective points of intersection with each of the radial lines 74. The arcs 80 are numbered (in increasing increments of 50 for purposes of illustration) from 200 to 700 to represent graphically speed arcs or speed circles. It will be readily appreciated that the radial lines 74 and the arcs 80 form a portion of a polar graph and that the polar graph as depicted in FIGURE 6 is to be used for speeds between 200 and 700 knots, which is a different speed range than the polar graph portion shown on surface 28 of lower member 16.

Figure 7:
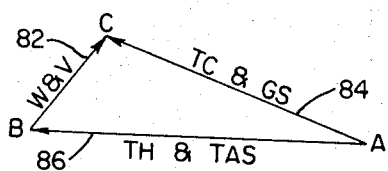
FIGURE 7 is a representation of a wind triangle.

Referring now to FIGURE 7, a wind triangle is shown comprising three simple vectors; (i) a wind vector 82 which represents the direction and speed of the wind, (ii) a ground vector 84 which represents the movement of the plane or aircraft with respect to the ground and is made up of the true course or track and the ground speed, and (iii) an air vector 86 which represents the movement of the plane with respect to the air mass and is made up of the true heading and the true air speed. Thus, it will be appreciated that there are, in all, six quantities involved: wind direction (W), wind speed (V), true course or track (TC), ground speed (GS), true heading (TH), and true air speed (TAS). Each of the vectors in the triangle has a direction and a length. The direction is measured as an angle from true north. The length is measured by some standard scale. The wind triangle can be determined in any of three ways: (i) by two sides and an included angle, (ii) by two angles and and included side, and (iii) by three sides.

The plotting and computing device of the subject invention provides a simple arrangement for setting up wind vector triangles of the standard type. The device consists of a movable disk or transparent, central portion 34 circumscribed by a 360° compass rose 36 which can be used to set the desired angular directions measured from true north. The solid line wind speed circles or the first set of circular lines 40 on the wind grid are utilized with the low speed side or surface 28 of the lower member 16. The broken line wind speed circles or the second set 42 of circular lines are utilized with the high speed side or surface 72 of the lower member 16.

There are four basic wind triangles with which the pilot is concerned. The first problem involves solving for true heading and ground speed. This problem is most common to pre-flight planning. To solve it graphically, the wind vector is plotted first, the true course is plotted on a reciprocal bearing from the head of the wind vector and the true air speed is swung on an arc across the true course vector. Thus, point A as shown in FIGURE 7 is thereby established.

The second problem is encountered if the flight requires a certain ground speed. Again, the wind vector is plotted first. The ground vector is established with its head to the head of the wind vector. The components of the air vector, i.e., true heading and true air speed, are then measured between points A and B as shown in FIGURE 7.

The third type of problem involves solving for true course and ground speed. This solution is basic to pure dead reckoning when no fixing aids are available. The wind vector is plotted and the head of the air vector attached to the tail of the wind vector. Departure point A, as shown in FIGURE 7, is established and the true course and ground speed can be measured between points A and C as shown in FIGURE 7.

The last problem involves solving for the actual wind. This problem is usually encountered while in flight. By establishing a departure point A, as shown in FIGURE 7, and plotting the air and ground vectors from it, points B and C as shown in FIGURE 7 are located. The wind is measured from B to C since the aircraft will always be blown from heading to track.

The operation of the plotting and computing device of this invention is now described. The problem is to find the ground speed and the true heading when the true course is 195°, the wind direction is 240°, the wind speed is 30 knots, and the true air speed is 180 knots. First, the true course of 195° as shown on the compass rose 36 is set directly opposite the 0° drift line 64. Next, the wind point is located on the transparent central portion 34. This is accomplished by finding the wind direction of 240° on the compass rose 36 and then proceeding toward the center of the central portion 34 until the line representing the wind direction intersects the appropriate wind circle of 30 knots. The wind point so located is designated by the numeral 88 in FIGURE 1. The wind point 88 may either be mentally noted or, if desired, marked with a pencil dot. Next, the lower member 16 is adjusted until the arc representing the true air speed of 180° is positioned directly under the wind point 88 as shown in FIGURE 1. The ground speed of 158 knots is then found by viewing through the aperture 90 formed at the intersection of the radial lines 38 formed on the transparent central portion 34. The wind correction angle of 7° to the right is obtained by noting the radial line 20 passing directly under the wind point 88. For example, it will be noted that the wind point 88 is approximately over the radial line seventh from the right of the center line 26. Since the wind correction angle is 7° to the right, the true heading is 7° to the right of the true course. Thus, the true heading of 202° is found by reading 7° to the right of the 0° drift line 64.

The true heading and true air speed may be found by setting the true course under the 0° drift line 64 of the true index. Next, the wind point is located. Then the lower member 16 is adjusted until the arc 22 representing the ground speed is read directly through the aperture 90. The true air speed is then obtained by reading the speed arc or circle under the wind point and the wind correction angle is obtained by noting the radial line 20 passing beneath the wind point. For example, for a true course of 240°, a wind direction of 90°, a wind speed of 20 knots and a ground speed of 140 knots, the true air speed will be 123 knots and the true heading will be 235°.

The true course or track and ground speed may be obtained by setting the true heading opposite the 0° drift line 64 of the true index as a temporary measure. Next, the wind point is located. Then, the lower member 16 is adjusted until the true air speed arc is positioned directly beneath the wind point. By noting the position of the wind point in relation to the wind correction angle lines, an approximate wind correction angle is obtained. Since this wind correction angle is the difference between the true heading and the true course, the compass rose is adjusted appropriately with respect to the true index, i.e., either to the right or to the left of the 0° drift line 64 by the amount of the wind correction angle. Next, the lower member 16 is adjusted until the true air speed arc is positioned beneath the wind point. If this action appreciably affects the wind correction angle, a second adjustment as outlined immediately above may be necessary. Then, the ground speed may be obtained by reading the speed circle shown through the aperture 90 and the true course is noted on the compass rose 36 opposite the 0° drift line 64 of the true index. For example, for a true heading of 175°, a wind direction of 320°, a wind speed of 30 knots, and a true air speed of 180 knots, the true course or track will be 170° and the ground speed will be 206 knots.

The wind direction and wind speed may be found by setting the true course opposite the 0° drift line 64 of the true index. Next, the lower member 16 is adjusted until the ground speed may be read through the aperture 90. Then, the figure for true heading and track are compared. The difference between the true heading and track is the wind correction angle. It will be noted on the compass rose 36 that the true heading is a certain amount either to the left or to the right of the true course. The wind point will likewise be on the left or right side of the central portion 34 by a like amount. The wind point is placed at the intersection of an appropriate wind correction line and the true air speed arc. Then, the wind direction and the amount of wind speed may be easily obtained. For example, for a true course of 122°, a ground speed of 154 knots, a true heading of 118° and a true air speed of 160 knots, the wind direction is 59° and the wind speed is 13 knots.

From the foregoing, it will be readily apparent that a vastly improved and greatly simplified plotting and computing device for solving wind vector problems has been described. For example, the plotting and computing device of this invention does not incorporate or use additional members such as a cursor and a slide therefor which are easily broken or damaged thereby rendering the device inoperable. Further, the subject device may be easily and quickly operated and such operation may be performed with one hand only. Additionally, it will be appreciated that as a result of using a transparent central portion 34 having a series of radial lines and a series of concentric circular lines thereon, it is possible to construct a plotting and computing device having a reduced number of parts but without adversely affecting the overall usefulness thereof and which is therefore less expensive to manufacture.

It is to be understood that this invention is not limited to the exact embodiment of the device shown and described, which is merely by way of illustration and not apparent to those skilled in the art, and it is therefore intended that the appended claims cover all such changes and modifications.

I claim:

1. A plotting and computing device for solving wind vector problems comprising a pair of superposed members, the lower one of said members having polar coordinate-lines thereon, the upper one of said members having a transparent central portion and a 360° compass rose circumscribing said central portion, said transparent central portion having a series of radial lines and a series of concentric circular lines thereon, said circular lines being spaced at fixed intervals from each other and calibrated in wind velocities, said superposed members being mounted for rotary and translatory movement with respect to each other.

2. A plotting and computing device as described in claim 1 in which said lower member comprises an elongated, generally rectangular member having indicia comprising a plurality of radial lines and arcs thereon representing a portion of a polar graph.

3. A plotting and computing device as described in claim 1 in which said lower member has indicia on opposed surfaces thereof, said indicia comprising a plurality of radial lines and arcs and representing a portion of a polar graph, indicia on one surface thereof being representative for one speed range and the indicia on the other surface thereof being representative for a different speed range, the series of concentric circular lines on said transparent central portion including a first set of circular lines to be used for one of the speed ranges of said lower member and a second set of circular lines to be used for the other of said speed ranges for said lower member.

4. A plotting and computing device as described in claim 3 in which said transparent central portion has an aperture formed therethrough at the point of intersection of said radial lines.

5. A plotting and computing device as described in claim 1 in which said lower member comprises an elongated, generally rectangular member, said rectangular member having indicia on opposed surfaces thereof, said indicia comprising a plurality of radial lines and arcs and representing a portion of a polar graph, indicia on one surface thereof being representative for one speed range and indicia on the other surface thereof being representative for a different speed range, the series of concentric circular lines on said transparent central portion including a first set of circular lines to be used for one of the speed ranges of said rectangular member and a second set of circular lines to be used for the other of said speed ranges of said rectangular member, said transparent central portion having an aperture formed therethrough at the point of intersection of said radial lines.

References Cited

UNITED STATES PATENTS

| | | | |
|---|---|---|---|
| 2,425,097 | 8/1947 | Isom | 235—61.02 |
| 2,756,929 | 7/1956 | McGee | 235—61.02 |
| 2,775,404 | 12/1956 | Lahr | 235—61.02 |
| 2,823,857 | 2/1958 | Heitor | 235—61.02 |

RICHARD B. WILKINSON, *Primary Examiner.*

L. R. FRANKLIN, *Assistant Examiner.*